United States Patent [19]

Garbo

[11] Patent Number: 5,001,902
[45] Date of Patent: Mar. 26, 1991

[54] COGENERATION SYSTEM WITH LOW $NO_x$ COMBUSTION OF LIQUID FUEL

[76] Inventor: Paul W. Garbo, 48 Lester Ave., Freeport, N.Y. 11520

[21] Appl. No.: 553,250

[22] Filed: Jul. 16, 1990

[51] Int. Cl.$^5$ ............................................. F01K 21/00
[52] U.S. Cl. ...................................... 60/648; 60/670
[58] Field of Search ................. 60/643, 645, 648, 670, 60/677, 678

[56] References Cited

U.S. PATENT DOCUMENTS 3,628,332  12/1971  Kennar ............................ 60/648 X
4,899,544   2/1990  Boyd ................................... 60/618

*Primary Examiner*—Allen M. Ostrager
*Attorney, Agent, or Firm*—Paul W. Garbo

[57] ABSTRACT

Cogeneration of electricity and carbon dioxide with low $NO_x$ combustion of vaporizable liquid fuels, particularly alcohols and hydrocarbons, is achieved by feeding the vaporized fuel admixed with a limited amount of air to a porous fiber burner and effecting flameless combustion on the outer surface of the burner to yield a flue gas with a very low content of $NO_x$ and other pollutants. The liquid fuel is vaporized by injection into hot combustion air preheated by heat exchange with the flue gas while heat from the burner is utilized to produce high-pressure steam which is supplied to a steam turbine that drives an electric generator. The flue gas is then passed through an absorption system for the recovery carbon dioxide, part of the steam being used in the absorption system. When desired, recovered carbon dioxide can be liquefied with refrigeration produced by the cogeneration system.

18 Claims, 1 Drawing Sheet

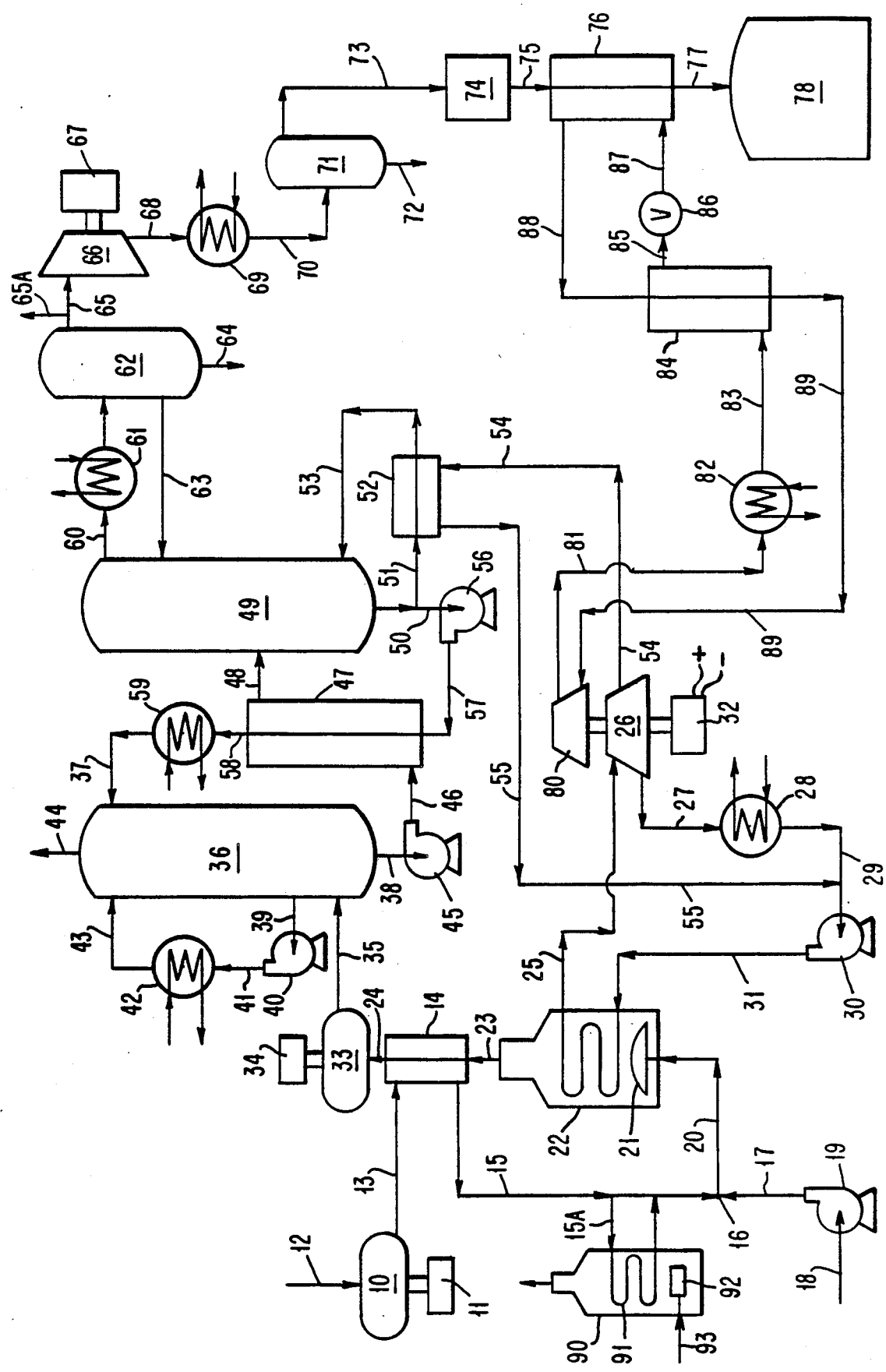

COGENERATION SYSTEM WITH LOW $NO_x$ COMBUSTION OF LIQUID FUEL

BACKGROUND OF THE INVENTION

This invention relates to the cogeneration of electricity and carbon dioxide ($CO_2$) with low $NO_x$ combustion of vaporizable liquid fuels.

Cogeneration systems have received considerable attention in recent years. Many processes have been proposed for the cogeneration of electricity and saleable refrigeration or heating steam. A few processes have been suggested for the cogeneration of electricity and $CO_2$. By and large, cogeneration has been based on fuel combustion associated with a gas turbine. However, the operation of gas turbines has two disadvantages: combustion is carried out with a large amount of excess air which reduces thermal efficiency, and the products of combustion or flue gas has a high content of nitrogen oxides ($NO_x$) and other atmospheric pollutants.

For example, U.S. Pat. No. 4,528,811 to Stahl shows several cogeneration systems involving gas turbines. Stahl points out that gas turbines are normally operated with about 300% excess air over the stoichiometric requirement; he proposes to curtail the use of excess air by recycling the combustion products to his two-portion combustor. However, such recycling is at the expense of compressing the expanded combustion products back to the pressure in the combustor. Moreover, such recyling does not curtail the formtion of $NO_x$ and other pollutants. To the contrary, Stahl's divided combustor which admittedly generates high temperatures may well increase the formation of $NO_x$, carbon monoxide (CO) and unburned hydrocarbons, particularly inasmuch as Stahl uses only 10% excess air in the combustion zone of his combustor.

U.S. Pat. No. 4,797,141 to Mercader et al describes a process for recovering heat contained in the combustion gases from an engine or turbine that drives an electric generator as well as heat given off by the engine or turbine. The recovered heat is used in the absorption separation of $CO_2$ from the combustion gases. However, the combustion gases from internal combustion engines are no less polluted than those from gas turbines.

In short, there is an urgent need to overcome the handicaps of cogeneration systems involving fuel combustion and gas turbines, namely, the use of a large amount of excess air and the emission of high levels of atmospheric pollutants.

Accordingly, a principal object of this invention is to avoid the use of gas turbines in cogeneration systems by substituting steam turbines therefor.

A related principal object is to generate steam for the steam turbines by burning a liquid fuel in a manner that minimizes the emission of $NO_x$ and other gaseous pollutants.

A further object is to limit the amount of excess air used in the combustion to yield a flue gas of increased $CO_2$ content.

Another important object is to recover $CO_2$ from the flue gas by absorption and desorption effected with some of the generated steam.

Still another important object is to liquefy the recovered $CO_2$ with refrigeration produced with energy derived from the generated steam.

These and other features and advantages of the invention will be evident from the description that follows.

SUMMARY OF THE INVENTION

In accordance with this invention, the cogeneration of electricity and $CO_2$ through low $NO_x$ combustion of a vaporizable liquid fuel comprises preheating combustion air in an amount not exceeding about 25% in excess of the stoichiometric requirement of the liquid fuel, injecting the liquid fuel into the preheated air to form a completely gaseous mixture of the fuel and air, effecting flameless combustion of the gaseous mixture on the outer surface of a porous fiber burner to produce high-pressure steam and yield hot flue gas with a low content of $NO_x$ and other gaseous pollutants, and passing the hot flue gas in heat exchange with the combustion air to effect the aforesaid preheating thereof.

The high-pressure steam is expanded with the performance of work which is used to drive an electric generator.

The flue gas after heat exchange with combustion air is treated in an amine absorption system for the separation and recovery of $CO_2$ wherein heat for stripping absorbed $CO_2$ is provided by a portion of the high-pressure steam after being partially expanded with the performance of work.

Part of the energy of the high-pressure steam may be utilized to compress the refrigerant vapor of a refrigeration system, particularly when liquid rather than gaseous $CO_2$ is the desired cogeneration product together with electricity. In such case, the gaseous $CO_2$ recovered by the amine absorption system is compressed, cooled and dehydrated, and finally liquefied with refrigeration produced with energy from the high-pressure steam.

Inasmuch as the production of $CO_2$ is a basic purpose of the cogeneration of this invention, the selection of a vaporizable liquid fuel, preferably alcohol, leads to an advantage over the use of natural gas and normally gaseous hydrocarbons. Thus, while the methane molecule requires 2 oxygen molecules to form $CO_2$ ($CH_4 + 2O_2 \rightarrow CO_2 + 2H_2O$), methanol requires only 1.5 oxygen molecules ($CH_3OH + 1.5O_2 \rightarrow CO_2 + 2H_2O$). Inasmuch as air has roughly 4 molecules of nitrogen for every molecule of oxygen, the $CO_2$ molecule formed from methane will be mixed with 8 nitrogen molecules while $CO_2$ formed from methanol will be mixed with 6 nitrogen molecules. Clearly, production of $CO_2$ by combustion of methane results in a flue gas wherein $CO_2$ is diluted by roughly 33% more nitrogen than when $CO_2$ is produced from methanol. This difference in $CO_2$ dilution by nitrogen diminishes when the liquid fuel is a hydrocarbon but not significantly. For example, a $C_{10}$-hydrocarbon will yield each $CO_2$ molecule admixed with 6.2 molecules of nitrogen compared to 8 nitrogen molecules when methane is the fuel. Hydrocarbon fractions containing aromatic and olefinic compounds are very desirable fuels for this invention. Thus, benzene yields $CO_2$ admixed with only 5 volumes of nitrogen which is obviously better than $CO_2$ in 6 volumes of nitrogen formed from methanol. In short, as the ratio of hydrogen to carbon of the fuel decreases the ratio of $CO_2$ to nitrogen or concentration of $CO_2$ in the flue gas increases.

Alcohols, particularly methanol which is the cheapest, and petroleum fractions containing aromatic and olefinic compounds are preferred fuels. As pointed out in U.S. Pat. No. 4,865,543 to Garbo, the liquid fuel used with the porous fiber burner must be completely vaporizable and may be any hydrocarbon fraction having an end boiling point not exceeding about 650° F. Preferably, the liquid fuel will have an end boiling point not exceeding about 500° F.; naptha and kerosene fractions are economic fuels within this preferred boiling range. Other sources of liquid hydrocarbon fractions that can be utilized by the invention are tar sands, shale oil, coal liquefaction and synthetic fuels. Alcohols derived from agricultural products may in some places be economic fuels for this invention. The liquid fuel must be free of any ash residue to prevent clogging of the porous fiber burner.

An advantage of porous fiber burners is that all of the combustion air is mixed with the fuel and rarely is more than 25%, but often is not more than about 15%, in excess of the stoichiometric requirement. This limitation of combustion air obviously helps in obtaining a flue gas wherein $CO_2$ is not excessively diluted.

BRIEF DESCRIPTION OF THE DRAWING

For a fuller understanding of the invention, the further description will refer to the appended drawing which is a flow diagram of the cogeneration system of the invention in a preferred integrated embodiment.

DESCRIPTION OF PREFERRED EMBODIMENT

The description of the flow diagram will include data of a specific example of the invention.

Combustion air is drawn in by blower 10 driven by electric motor 11 at inlet 12 and impelled through line 13, heat exchanger 14 and line 15 into tee connection 16 into which methanol is injected via line 17. Methanol from a supply (not shown) flows through line 18 to pump 19 which feeds the methanol to line 17 at the rate of 32,160 pounds per hour. The methanol injected into tee connector 16 is dispersed in combustion air, preheated to a temperature of 280° F. in exchanger 14, whereupon the methanol is completely vaporized. The amount of preheated combustion air which is admixed with the methanol is limited to 10% in excess of the stoichiometric requirement. The mixture of air and vaporized methanol passes from tee 16 via line 20 into porous fiber burner 21 in steam boiler 22.

Burner 21 has a porous fiber layer on its convex side. The production of porous fiber burners is well known. Basic teachings of such burners are found in U.S. Pat. No. 3,275,497 and U.S. Pat. No. 3,383,159 which adds aluminum powder in the porous fiber layer to suppress the formation of CO. While burner 21 is simply represented as having a large convex-lens shape, other shapes, such as tubular, may be used. In fact, the shape of burner 21 will usually be selected depending on the size and configuration of boiler 22. Inasmuch as the porous fiber layer of burner 21 becomes a glowing surface during combustion that radiates infrared energy, burner 21 is disposed in boiler 22 so that the glowing surface faces the steam-generating tubes therein. Also, while a single burner 21 is shown in boiler 22 to simplify the diagram, it will be appreciated that generally a multiplicity of burners 21 will be used in any large boiler 22.

Hot flue gas, containing only 15 ppm $NO_x$, 24 ppm CO and 2 ppm unburned hydrocarbons, leaves boiler 22 at a temperature of 350° F. and passes through line 23 and heat exchanger 14 from which it exits at a temperature of 160° F. via line 24. Steam generated in boiler 22 passes at a pressure of 600 psia via line 25 into steam turbine 26. Fully expanded steam leaves turbine 26 through line 27 and passes through water-cooled condenser 28. The pressure at the exit port of steam turbine 26 is about 2.5 inches of mercury column. The condensate formed in condenser 28 drains via line 29 into pump 30 which returns it via line 31 to boiler 22. The work performed by steam turbine 26 is utilized to drive electric generator 32 which is connected thereto. Generator 32 produces 17.9 megawatts (MW) of electricity.

Flue gas flowing in line 24 enters blower 33 driven by electric motor 34 and is pressurized enough to flow via line 35 into and up through absorption column 36 in scrubbing relation with counter-flowing amine solution. Regenerated amine solution enters column 36 via line 37 and $CO_2$-laden solution leaves column 36 through line 38. Heat of absorption is dissipated by circulating the amine solution of column 36 through line 39, pump 40, line 41, water-cooled exchanger 42 and line 43. The discard gas, predominantly nitrogen with about 10% by volume of water vapor, leaves column 36 through line 44.

Pump 45 passes the $CO_2$-enriched amine solution from line 38 through line 46, heat exchanger 47 and line 48 into stripping column 49. Stripping heat is supplied to column 49 by circulating amine solution through lines 50,51, reboiler 52 and line 53. Reboiler heat is obtained by drawing steam from an intermediate stage of steam turbine 26 through line 54 connected to reboiler 52. The steam entering reboiler 52 is at a pressure of 70 psia and temperature of 320° F. The condensate formed in reboiler 52 flows through line 55 to pump 30 which returns the total condensate of lines 29, 55 to boiler 22 via line 31.

Stripped amine solution from line 50 is returned by pump 56 through line 57, heat exchanger 47, line 58, water-cooled exchanger 59 and line 37 to absorption column 36. Part of the heat in the stripped amine solution is transferred in exchanger 47 to the $CO_2$-laden amine solution flowing into stripping column 49.

$CO_2$ gas released from the amine solution rises in column 49 and together with water vapor passes via line 60 through water-cooled condenser 61 to discharge into separator 62. Water condensate returns from separator 62 via line 63 as reflux in column 49. Water is discarded from separator 62 through drain line 64 at the same rate at which water vapor enters column 36 with the flue gas from line 35.

$CO_2$ leaves separator 62 via line 65 at slightly above atmospheric pressure and a temperature of about 100° F. The gas is saturated with water vapor but otherwise is $CO_2$ containing a very small fractional percentage by volume of other gases such as nitrogen and oxygen. At this point, the $CO_2$ gas could be utilized to enhance the recovery of crude oil from an underground formation as taught in U.S. Pat. No. 3,443,332 to Keith or to provide an inert atmosphere as required in some chemical or metallurgical operations. When necessary, the $CO_2$ would be dehydrated before use.

Liquid $CO_2$ is a more valuable form of the product that is in great demand, e.g., by manufacturers of carbonated beverages and frozen foods. To effect liquefaction, $CO_2$ gas from line 65 is compressed by centrifugal compressor 66, driven by electric motor 67, to a pressure of 220 psia and flows via line 68 through water-cooled condenser 69 wherein the gas temperature is reduced to about 100° F. with the result that moisture in the gas is condensed. The cooled steam flows through line 70 into separator 71 wherein water condensate is knocked down and discharged via drain line 72.

$CO_2$ gas saturated with moisture exits separator 71 via line 73 and passes through dryer 74 wherein residual moisture is removed from the compressed $CO_2$ gas. Dryer 74 may be filled with a molecular sieve that adsorbs moisture but any of various known dryers may be used to dehydrate the $CO_2$ gas. Dry $CO_2$ gas passes through line 75 and heat exchanger 76 wherein it is liquefied. Liquid $CO_2$ discharges via line 77 into storage tank 78 at a temperature of $-20°$ F. and pressure of 215 psia. Liquid $CO_2$ is recovered at the rate of 41,700 pounds per hour.

The refrigeration required for the liquefaction of $CO_2$ in exchanger 76 is provided by compressing a refrigerant vapor, such as DuPont Freon R-12, cooling the compressed refrigerant to liquefy it, subcooling the liquefied refrigerant, and expanding the subcooled liquid to yield refrigeration with the evaporation of the liquid refrigerant. Specifically, the energy for compressing the refrigerant vapor is derived from steam turbine 26 by having centrifugal compressor 80 driven by steam turbine 26. Compressor 80 raises the pressure of Freon R-12 to 135 psia and the temperature to about 200° F.

The hot compressed refrigerant vapor exiting compressor 80 via line 81 passes through water-cooled condenser 82 and at a temperature of 100° F. continues to flow as liquid in line 83 to subcooler exchanger 84. The subcooled refrigerant leaves subcooler 84 at a temperature of 20° F. through line 85 and passes through pressure-reducing valve 86. The liquid refrigerant discharges from valve 86 at a pressure of 12 psia and temperature of $-30°$ F. via line 87 into heat exchanger 76 wherein it is vaporized by heat abstracted from $CO_2$ undergoing liquefaction therein. Refrigerant vapor passes from exchanger 76 through line 88, sub-cooler 84 and line 89 to return to compressor 80 at a temperature of 80° F. and pressure of 10 psia. The refrigeration cycle delivers 510 tons of refrigeration to exchanger 76 at a temperature level of $-30°$ F. However, the temperature level of the delivered refrigeration can be varied, e.g., over the range of about 20° F. down to $-60°$ F., if the refrigeration is to be utilized for other purposes such as freezing fish and meat.

Electric motors 11, 34, 67 and those (not shown) for pumps 19,30,40,45,56 consume a total of about 2.4 MW of electric power. Pumps to circulate cooling water to exchangers 28,42,59,61,69,82 and fans of a water-cooling tower are estimated to consume approximately 0.9 MW. Hence, of the 17.9 MW of power produced by generator 32, 14.6 MW are available for sale after satisfying the power requirements of the cogeneration system.

Recapping the example described in relation to the flow-sheet, the hourly combustion of 32,160 pounds of methanol with only 10% in excess of the stoichiometric requirement of air with a porous fiber burner yields a flue gas containing a remarkably low content of pollutants, thus achieving an important advance in environmental protection. Besides producing a flue gas in which $CO_2$ is not excessively diluted by nitrogen, the combustion produces enough high-pressure steam to drive an electric generator delivering 17.9 MW of power and to drive a refrigerant compressor delivering 510 tons of refrigeration. Moreover, steam is available for operating the reboiler of a $CO_2$ stripping column in an amine absorption system used to recover $CO_2$ from the flue gas. The recovered $CO_2$ gas with a purity of about 99.9% by volume is liquefied by applying the refrigeration generated within the system. Thus, the cogeneration system has a production capacity of 500 tons per day of liquid $CO_2$.

While the cogeneration example produces electricity and liquid $CO_2$, when only gaseous $CO_2$ is desired as a product of cogeneration, 360,000 SCFH of $CO_2$ will be delivered by line 65 and 510 tons of refrigeration at a temperature of $-30°$ F. will be available at heat exchanger 76 as a third saleable product of cogeneration. In short, the cogeneration system can simultaneously deliver three products: refrigeration, electric power and substantially pure $CO_2$ gas, while discharging into the atmosphere a vent gas, predominantly nitrogen, with an unusually low content of pollutants: $NO_x$, CO and unburned hydrocarbons.

On the other hand, the cogeneration system may be desired for the production of only electricity and gaseous $CO_2$. In such a system, all of the elements with reference numerals 66 through 89 will be eliminated; not only will the plant cost be reduced but also the output of generator 32 will be increased to 19 MW in the absence of refrigerant compressor 80. The elimination of motor 67 and of water-cooled exchangers 69, 82 will obviously reduce the portion of the generated electricity which is consumed within the system.

In some cases, the liquid fuel, e.g., kerosene, would not be completely vaporized by injecting it into the combustion air preheated solely by heat exchange with hot flue gas from the steam boiler. In such circumstances, supplemental heat must be provided to ensure complete vaporization of the liquid fuel. Referring to the flowsheet, supplemental heat is added to preheated air in line 15 by diverting a portion or all of it to branch line 15A connected to coil 91 in heater 90. While heater 90 may take any known form, it is shown as having burner 92 supplied with fuel by line 93.

Limiting the amount of combustion air to not more than about 25% in excess of the stoichiometric requirement, preferably not more than about 15% in excess, leads to high thermal efficiency. Such a limited amount of combustion air is made practical by the use of a porous fiber burner which permits surface flameless combustion of the fuel yielding a flue gas with a remarkably low content of pollutants which on a volume basis rarely exceed about 20 ppm $NO_x$, 50 ppm CO and 5 ppm unburned hydrocarbons. The suppresion of CO emission is enhanced by a small amount of fine aluminum powder uniformly distributed in the porous fiber layer of the burner as taught by aforesaid U.S. Pat. No. 3,383,159.

The term amine used herein is a shortened word for a class of chemical absorbents known as alkanolamines. The two amines which have proved to be of principal commercial interest are monoethanolamine and diethanolamine. While the specific example of the invention is based on monoethanolamine, other amines are available for use in the invention. A fairly broad discussion, entitled Alkanolamines for Hydrogen Sulfide and Carbon Dioxide Removal, by Kohl and Riesenfeld in their textbook Gas Purification (pages 29–109, 4th Edition, 1985, Gulf Publishing Company), presents the technology of separating $CO_2$ from other gases and is made a part of this disclosure.

Variations and modifications of the invention will be apparent to those skilled in the art without departing from the spirit and scope of the invention. For example, if it is desired to reduce the gas temperature of the flue gas before it enters absorption column 36, a water-cooled exchanger may be inserted in line 35 or, more simply, water may be injected into line 35 to drop the gas temperature. A single steam turbine 26 with line 54 for drawing steam from an intermediate pressure stage of turbine 26 is shown in the drawing; however, two steam turbines connected in tandem may replace turbine 26 and line 54 can then draw steam from the connection between the two turbines. Claim language such as: the steam turbine has a port at an intermediate pressure stage, is intended as a simple expression for two steam turbines in tandem. Branch line 65A is provided to permit the delivery of some of the recovered $CO_2$ in gaseous form for one customer while the remainder is liquefied for another customer. The liquid fuel may also be preheated to facilitate its complete vaporization in the preheated combustion air. Repeated mention of a porous fiber burner in the specification and claims is clearly a simple expression for a multiplicity of such burners supplied in parallel with the mixture of vaporized liquid fuel and combustion air. Accordingly, only such limitations should be imposed on the invention as are set forth in the appended claims.

What is claimed is:

1. A cogeneration system for the production of electricity and carbon dioxide with low $NO_x$ combustion of liquid fuel, which comprises a high-pressure steam boiler, a porous fiber burner within said boiler, a countercurrent heat exchanger connected to receive the flow of flue gas from said boiler, an air blower connected to said heat exchanger for the flow of air countercurrent to the flow of said flue gas, a feed tube connected to said porous fiber burner, a pipe connected for the flow of hot air from said heat exchanger to said feed tube, a pump connected to feed liquid fuel to said feed tube, a steam turbine connected to receive and expand high-pressure steam from said boiler and to return expanded and condensed steam to said boiler, an electric generator driven by said steam turbine, a flue gas blower connected to receive flue gas from said heat exchanger, and an amine absorption system for the recovery of carbon dioxide from flue gas supplied by said flue gas blower, said absorption system having a stripping column with a reboiler connected so as to be heated by steam withdrawn through a port at an intermediate pressure stage of said steam turbine.

2. The cogeneration system of claim 1 wherein a centrifugal compressor is driven by the steam turbine, said compressor being the part of a refrigeration system in which a refrigerant vapor is compressed.

3. The cogeneration system of claim 2 wherein a carbon dioxide compressor is connected to receive the carbon dioxide receovered from the stripping column of the amine absorption system, a water-cooled heat exchanger is connected to receive compressed carbon dioxide from said carbon dioxide compressor, dehydrating means are connected to receive the cooled compressed carbon dioxide, a liquefier is connected to receive the dehydrated compressed carbon dioxide, said liquefier being connected to receive refrigeration from the refrigeration system, and a tank is connected to receive liquid carbon dioxide from said liquefier.

4. The cogeneration system of claim 3 wherein the porous fiber burner contains a uniformly distributed, amall amount of fine aluminum powder.

5. The cogeneration system of claim 1 wherein an air heater is connected to receive hot air from the countercurrent heat exchanger and to discharge hotter air into the feed tube.

6. The cogeneration system of claim 1 wherein the porous fiber burner contains a uniformly distributed, small amount of fine aluminum powder.

7. The cogeneration process for producing electricity and carbon dioxide with low $NO_x$ combustion of a vaporizable liquid fuel, which comprises preheating combustion air in an amount not exceeding about 25% in excess of the stoichiometric requirement of said liquid fuel, injecting said liquid fuel into the preheated air to effect vaporization thereof, introducing the resulting gaseous mixture into a porous fiber burner and effecting flameless combustion of said mixture on the outer surface of said burner thereby yielding hot flue gas of low $NO_x$ content not exceeding about 20 ppm, passing said flue gas in countercurrent heat exchange with said combustion air to effect the aforesaid preheating thereof, producing high-pressure steam with heat from said flameless combustion, expanding said high-pressure steam with the performance of work while utilizing said work to drive an electric generator, and introducing said flue gas after said countercurrent heat exchange into an amine absorption system for the recovery of carbon dioxide wherein heat for stripping absorbed carbon dioxide from the amine solution is provided by a portion of said high-pressure steam after being partially expanded with the performance of work.

8. The cogeneration process of claim 7 wherein part of the work performed by expanding the high-pressure steam is utilized to compress the refrigerant vapor of a refrigeration system.

9. The cogeneration process of claim 8 wherein the recovered carbon dioxide is compressed, water-cooled and dehydrated, and then liquefied with refrigeration from the refrigeration system.

10. The cogeneration process of claim 9 wherein the liquid fuel is methanol.

11. The cogeneration process of claim 10 wherein the combustion air is in an amount not exceeding about 15% in excess of the stoichiometric requirement.

12. The cogeneration process of claim 7 wherein the combustion air after being preheated by countercurrent heat exchange with the flue gas is further heated prior to the injection of the liquid fuel thereinto.

13. The cogeneration process of claim 7 wherein the liquid fuel has an end boiling point not exceeding about 500° F.

14. The cogeneration process of claim 13 wherein the porous fiber burner contains a uniformly distributed, small amount of fine aluminum powder.

15. The cogeneration process of claim 7 wherein the liquid fuel is an alcohol, the combustion air is in an amount not exceeding about 15% in excess of the stoichiometric requirement, and the recovered carbon dioxide is compressed, water-cooled, dehydrated and finally liquefied by refrigeration produced with energy derived from the high-pressure steam.

16. The cogeneration process for producing electricity and liquid carbon dioxide with low $NO_x$ combustion of methanol, which comprises forming a hot mixture of vaporized methanol and combustion air in an amount not exceeding about 25% in excess of the stoichiometric requirement, effecting flameless combustion of said mixture on the outer surface of a porous fiber burner thereby yielding a flue gas containing not more than about 20 ppm of $NO_x$, producing high-pressure steam with heat from said flameless combustion, expanding said high-pressure steam with the performance of work while utilizing said work to drive an electric generator, separating carbon dioxide from said flue gas by scrubbing said flue gas with amine solution and by stripping absorbed carbon dioxide from said amine solution with heat from some of said high-pressure steam after being partially expanded with the performance of work, compressing, cooling and dehydrating the separated carbon dioxide, and liquefying the dehydrated carbon dioxide with refrigeration produced with energy derived from said high-pressure steam.

17. The cogeneration process of claim 16 wherein the combustion air is in an amount not exceeding about 15% in excess of the stoichiometric requirement.

18. The cogeneration process of claim 17 wherein the porous fiber burner contains a uniformly distributed, small amount of fine aluminum powder.

* * * * *